(12) United States Patent
Bauer

(10) Patent No.: US 6,801,794 B2
(45) Date of Patent: Oct. 5, 2004

(54) OPERATING STATE BASED ENERGY-SAVING DISPLAY DEVICE

(75) Inventor: Harald Bauer, Nuremberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 587 days.

(21) Appl. No.: 09/741,973

(22) Filed: Dec. 20, 2000

(65) Prior Publication Data

US 2001/0024967 A1 Sep. 27, 2001

(30) Foreign Application Priority Data

Dec. 23, 1999 (DE) ......................................... 199 62 282

(51) Int. Cl.[7] ................................................ H04B 1/16
(52) U.S. Cl. ..................... 455/574; 455/90; 455/525; 455/44; 455/456
(58) Field of Search .................. 455/343, 31.3, 455/574, 566, 525, 90, 127, 571, 572, 573, 557; 379/413; 345/51, 52, 102, 211, 212

(56) References Cited

U.S. PATENT DOCUMENTS

| | | | | |
|---|---|---|---|---|
| 4,980,575 A | * | 12/1990 | Schenkel | .................... 307/121 |
| 5,680,441 A | * | 10/1997 | Gallo | ........................ 455/74.1 |
| 5,684,294 A | * | 11/1997 | Kouhi | ................... 250/214 AL |
| 5,838,257 A | * | 11/1998 | Lambropoulos | ........... 340/5.61 |
| 5,881,377 A | * | 3/1999 | Giel et al. | ............... 455/343.1 |
| 5,894,298 A | * | 4/1999 | Hoeksma | ..................... 345/102 |
| 5,953,677 A | * | 9/1999 | Sato | ............................ 455/574 |
| 6,023,256 A | * | 2/2000 | Ng et al. | ....................... 345/51 |
| 6,107,930 A | * | 8/2000 | Behlke et al. | ......... 340/825.19 |
| 6,141,568 A | * | 10/2000 | Sakaguchi | ................... 455/566 |
| 6,157,849 A | * | 12/2000 | Cho | ............................ 455/566 |
| 6,175,353 B1 | * | 1/2001 | Hoeksma | ..................... 345/102 |
| 6,278,887 B1 | * | 8/2001 | Son et al. | ..................... 455/566 |
| 6,317,614 B1 | * | 11/2001 | Okada | ......................... 455/574 |
| 6,426,736 B1 | * | 7/2002 | Ishihara | ...................... 345/102 |
| 6,518,957 B1 | * | 2/2003 | Lehtinen et al. | ............. 345/173 |
| 6,522,319 B1 | * | 2/2003 | Yamazaki | .................... 345/103 |
| 6,611,697 B1 | * | 8/2003 | Ewing et al. | ................ 320/114 |

FOREIGN PATENT DOCUMENTS

| | | | | |
|---|---|---|---|---|
| CN | 1170186 A | 1/1998 | ............ G09G/3/18 |
| GB | 2316837 A | 3/1998 | ............ H04Q/7/38 |
| WO | WO9940561 | 8/1999 | ............ G09G/3/36 |

* cited by examiner

Primary Examiner—Pablo N. Tran
(74) Attorney, Agent, or Firm—Aaron Waxler

(57) ABSTRACT

For a terminal for mobile communication which includes a display device it is proposed to save energy by arranging a control device so as to disconnect at least a part of the display device in dependence on a relevant operating state.

9 Claims, 1 Drawing Sheet

OPERATING STATE BASED ENERGY-SAVING DISPLAY DEVICE

The invention relates to a terminal for mobile communication, for example a so-called handset or cordless telephone. In such apparatus various energy-saving modes are activated by evaluation of operating states, which energy-saving modes prolong the so-called life of the apparatus which usually utilize a rechargeable power supply source. Therefore, such apparatus are usually equipped with a liquid crystal display having a very low power consumption.

It is an object of the invention to reduce the power consumption in an apparatus of the kind set forth.

This object is achieved by a control device arranged to disconnect, partially or completely, a display device from a mobile communication terminal in dependence on one or more operating states.

Surprisingly it has been found that disconnection of a part of the display device also yields a reduction of the power consumption in liquid crystal displays. Until now such disconnection was considered to be superfluous, because the power consumption of the other parts of a terminal imposes far higher power requirements also in the standby mode. As steps for reducing the power requirements in the standby mode become more and more effective, however, such a power-saving step also has noticeable effects on the standby time.

Complete disconnection of the display device involves the risk that the user is given the wrong impression that the power supply source in the terminal apparatus is fully exhausted. In a special embodiment, therefore, all parts of the display device are deactivated except for the part showing the name and/or the logo of the mobile radio operator at which the terminal is checked in at the time.

The decision as to when the terminal apparatus should enter the operating state in which it partly or completely deactivates the display device can in principle be taken in a time-dependent manner, for example by measurement of the time elapsed since the last actuation of a key. Additional sensors, such as a light-sensitive sensor or a motion-sensitive sensor, for example, can switch off the display device completely, for example when the terminal apparatus is present in the dark. In this case a display is fully useless, since a user cannot make out anything without additional backlighting which, as is generally known from the state of the art, can be activated only by actuation of an arbitrary key. A motion-dependent sensor can switch the display device, for example from partial display to full display again. This makes sense, for example, when a terminal rests in an immobile state, for example on a table. Full display is then activated again by touching the terminal.

The invention will be described in detail hereinafter with reference to an embodiment as shown in the drawing. Therein:

Figure 1:
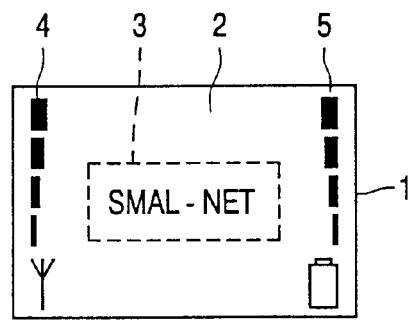
FIG. 1 shows a display device in which all display sections are activated.
Figure 3:
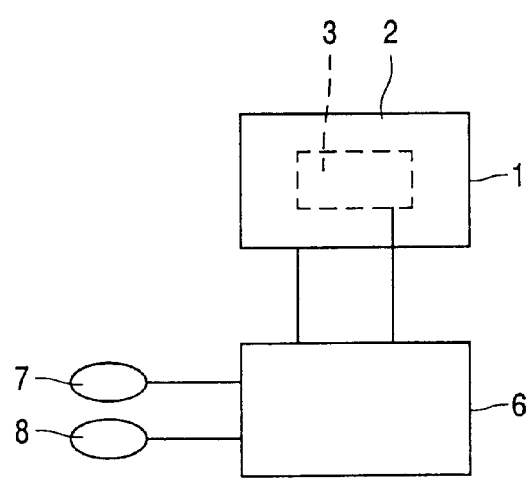
FIG. 3 shows a control device of a terminal according to the invention.

FIG. 3 shows a control device 6 of a terminal for mobile communication whereto a display device 1 is connected. Two separate sections 2, 3 of the display device 1 can be activated independently of one another by means of control lines. Two sensors, that is, a light-sensitive sensor 7 and a motion-sensitive sensor 8, are connected to the control device 6. In the basic state, for example immediately after the switching on the terminal, both sections 2, 3 of the display device 1 are activated. FIG. 1 shows a display device 1 in which, for example, the receiving field strength of a mobile radio transmitter received is displayed by means of appropriate first symbols 4 in a first section 2 whereas the charging state of the accumulator is displayed by means of second symbols 5. The name of the mobile radio operator in which the terminal apparatus is checked iii is displayed in a second section 3 of the display device 1.

When the terminal is stored, for example in a handbag by a user, a sudden decrease of the illumination level occurs in the vicinity of the terminal apparatus. On the basis of an evaluation by the light-sensitive sensor 7, the control device 6 recognizes this state and deactivates both sections 2, 3 of the display device 1. For obvious reasons the display device is not shown in this state of operation, because nothing could be seen on the display device.

Figure 2:
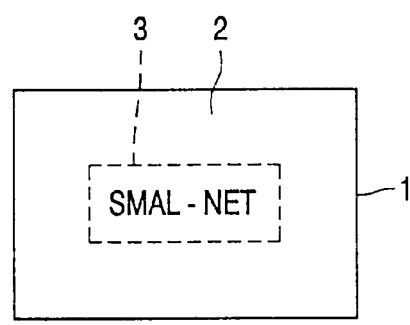
FIG. 2 shows a display device in a first energy-saving mode in which only a part of the display device is activated.

When the terminal is removed from the handbag and light is once more incident on the photosensitive sensor 7, the control device 6 activates both sections of the display device again. After a given period of time has elapsed, the display device is partly activated by evaluation by the motion-sensitive sensor 8. FIG. 2 shows this operating state in which only the name of the mobile radio operator can be recognized. This operating state occurs, for example when the terminal is placed on a table.

As is shown, arbitrary possibilities for activation of the display device 1 can be created by appropriate construction and programming of the control device 6 for different operating states of the terminal and by measurement of the elapsed time and by means of sensors. Just to mention one further application, a distinction can be made not only between ambient light and absence of ambient light, but it is also possible to evaluate the level of the ambient light, so as to switch over to partial display, for example in the case of an intermediate ambient light level as sometimes encountered in pubs.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A mobile communication terminal, comprising:
    a photosensitive sensor operable to sense ambient light;
    a display device including a first section and a second section; and
    a control device,
        wherein said control device is operable to exclusively deactivate said first section or concurrently deactivate said first second and said second section as a function of a status of said photosensitive sensor and said second section displays at least one of a name and a logo in response to a deactivation of the first section by said control device.

2. The mobile communication terminal of claim 1, wherein said control device is operable to exclusively deactivate said first section as a function of said photosensitive sensor sensing a presence of ambient light.

3. The mobile communication terminal of claim 1, wherein said control device is operable to exclusively deactivate said first section or concurrently deactivate said first section and said second section as a function of said photosensitive sensor sensing an absence of ambient light.

4. A mobile communication terminal, comprising:

a motion sensor operable to sense movement of the mobile communication terminal;

a display device including a first section and a second section; and a control device operable to deactivate said first section as a function of said motion sensor sensing the mobile communication terminal resting in an immobile state and said second section displays at least one of a name and a logo in response to an deactivation of the first section by said control device.

5. The mobile communication terminal of claim 4, wherein said control device is operable to deactivate that at least part of said display device in response to said motion sensor sensing the mobile communication terminal resting in an immobile state for a predetermined period of time.

6. A mobile communication terminal, comprising:

a photosensitive sensor operable to sense ambient light;

a motion sensor operable to sense movement of the mobile communication terminal;

a display device having a first section and a second section; and a control device operable to deactivate at least a part of said display device as a function of a first status of said photosensitive sensor and a second status of said motion sensor wherein said first section is deactivated in response to said motion sensor sensing the mobile communication terminal resting in an immobile state for a predetermined period of time and said second section displays at least one of a name and a logo in response to a deactivation of the first section.

7. The mobile communication terminal of claim 6, wherein said control device is operable to exclusively deactivate said first section as a function of said photosensitive sensor sensing a presence of ambient light.

8. The mobile communication terminal of claim 6, wherein said control device is operable to exclusively deactivate said first section or concurrently deactivate said first section and said second section as a function of said photosensitive sensor sensing an absence of ambient light.

9. The mobile communication terminal of claim 6, wherein said control device is operable to exclusively deactivate said first section as a function of said motion sensor sensing the mobile communication terminal resting in an immobile state.

* * * * *